Patented Dec. 30, 1941

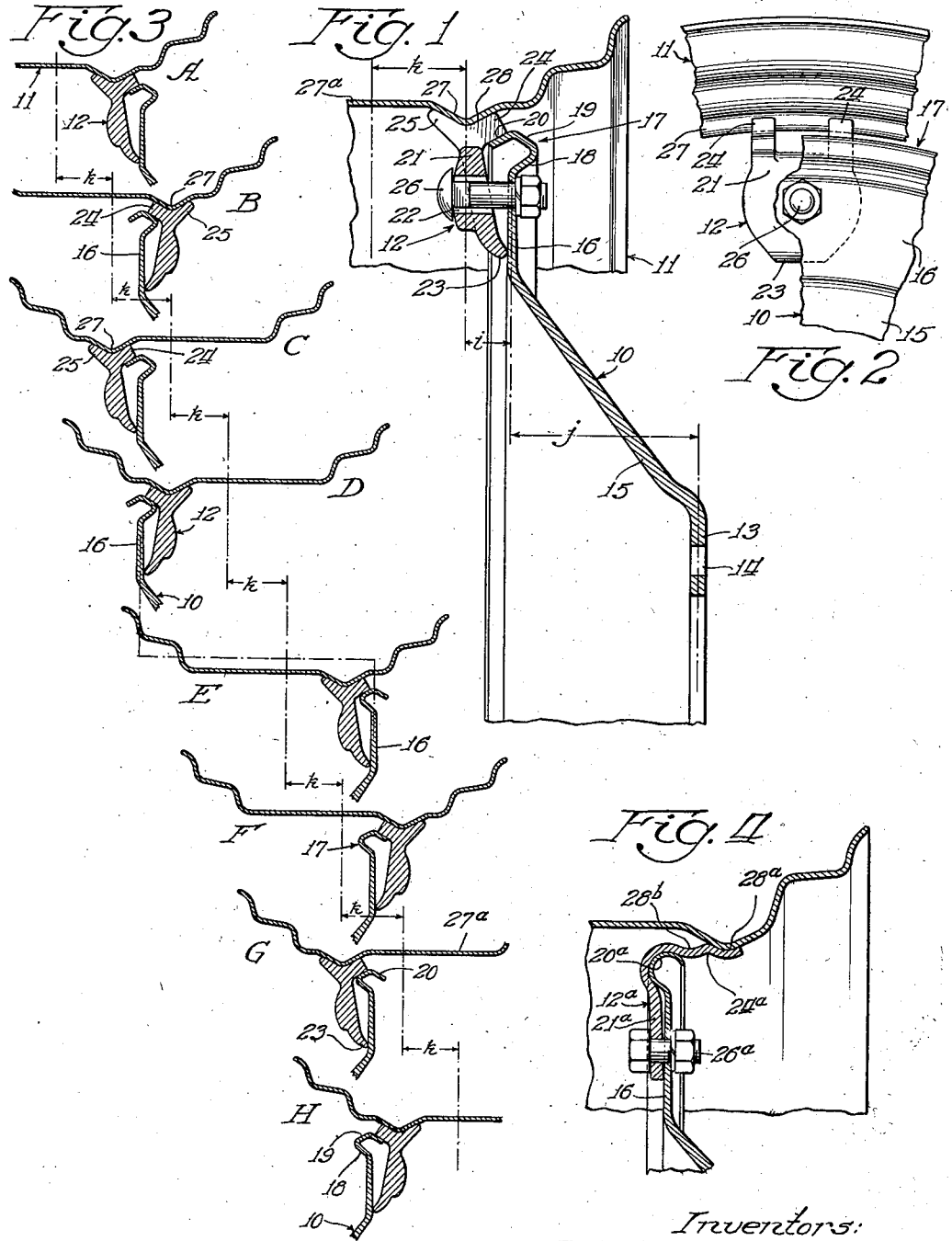

2,267,980

UNITED STATES PATENT OFFICE 2,267,980

DISK WHEEL

Joseph W. Jones and Walton H. Frechtling, Chicago, Ill., assignors to Borg-Warner Corporation, Chicago, Ill., a corporation of Illinois Application April 26, 1939, Serial No. 270,074

5 Claims. (Cl. 301—20)

This invention relates to vehicle wheels of the type in which the rim is adjustable axially with respect to the hub, and has as its general object to provide such a wheel having at least eight different positions of adjustment, which is more simple and less expensive is construction than previously available wheels having that many positions of adjustment.

Wheels of this general type now available, including a rim, a wheel body or central disk member, and mounting lugs interposed between the rim and wheel body, provide for four positions of adjustment by providing two axially spaced inwardly projecting beads in the rim, and two depressions in each mounting lug, each adapted to receive either of the beads. Four additional positions of adjustment are provided by reversing the wheel body relative to the hub on which it is mounted, the peripheral seating region of the wheel body being offset axially relative to the central region which attaches to the hub.

The present invention simplifies and improves upon such wheels by providing for reversal of the mounting lug relative to the wheel body, thus making it possible to employ only a single rim-engaging depression in the lug, the axial position of which, relative to the wheel body, is shifted by the reversal of the lug.

Another improvement contemplated in the present invention is the employment of only a single lug engaging bead in the rim, located nearer one side of the rim than the other, and making the rim reversible so as to secure two positions of the rim, with the same portion thereof engaged by the lug in either of such positions.

Another object of the invention is to provide a novel construction and arrangement of mounting lug, wheel body and rim, wherein the lug is substantially Y-shaped, having an apertured body portion and a pair of diverging jaws formed on one end thereof and adapted to snugly embrace a depressed or beaded region of the rim, one of the jaws being interposed between the rim and the lug seating face of the wheel body, and the body portion being clamped against the wheel body with its end opposite the jaws fulcrumed radially inwardly of the jaws.

An important object of the invention is to provide, in an adjustable rim wheel having the advantages set forth above, a wheel body portion which is formed with a minimum of expense by rolling and swaging from a flat blank. To this end, the lug seating peripheral region of the wheel body is formed by turning or curling such peripheral region. In order to properly form this peripheral region so as to provide for securing the mounting lugs on either side thereof, in the two positions of reversal thereof, the web portion of the wheel body is made re-entrant with respect to the turned peripheral portion, and the latter is provided with opposed sloping portions disposed on either side of the plane of the web portion.

The invention, in preferred forms, is illustrated in the accompanying drawing, in which:

Fig. 1 is a sectional view through a portion of a wheel embodying the invention.

Fig. 2 is an elevation of a portion of a wheel embodying the invention.

Fig. 3 is a schematic view illustrating the eight possible positions of adjustment provided for by the invention.

Fig. 4 is a sectional view of a portion of a wheel embodying a modified form of the invention, wherein 16 positions of adjustment are possible.

As an illustration of one form in which the invention may be embodied, I have shown in Fig. 1 portions of a wheel comprising in general, a wheel body portion 10, a rim 11, and mounting lugs 12 interposed between the wheel body 10 and the rim 11.

The wheel body 10 comprises a flat central portion 13 having apertures 14 through which bolts may be extended for securing the wheel body to a hub. The central disk portion 13 merges into a frusto-conical portion 15, which is preferably tapered to a lesser thickness toward its outer extremity.

The frusto-conical portion 15 is continued radially outwardly in a flat flange to form a peripheral web portion 16, which may continue to decrease in thickness toward its outward extremity.

The outer extremity of the web portion 16 is curled to form a turned seat region designated generally at 17. The seat region 17 is connected to the web portion 16 by a re-entrant shoulder region 18, and is formed into two frusto-conical wall portions providing inclined seating faces 19 and 20 respectively, against which the lugs 12 may engage. These seating faces are arranged symmetrically on opposite sides of the plane of the web portion 16, the re-entrant shoulder 18 providing for such centering of the web portion with respect to the seating faces. The re-entrant shoulder and curled construction provides the outer periphery of the wheel body with a certain amount of resilience which is useful in absorbing radially impressed shock loads.

The lugs 12 each comprise a body portion 21 formed at one end with a tail portion 23 adapted to fulcrum against the web portion 16 of the wheel body, and provided at its opposite end with a head region comprising a pair of radially outwardly diverging jaws 24 and 25.

The jaw 24 is adapted to be interposed between the rim and the seating portion 20, as shown in Fig. 1, or between the rim and the seating portion 19, as indicated in position b of Fig. 3, in which position the lug is reversed with respect to the first-mentioned position, and is disposed on the opposite side of the web 16. A clamping bolt 26 is provided for drawing the lug toward the web 16 and causing its jaw portion 24 to be wedged outwardly against the seating face 20 or 19 as the case may be. The bolt 26 extends through the aperture 22 in the lug and through a suitable corresponding aperture in the web portion 16.

The jaws 24 and 25 define between them a radially outwardly opening V-shaped depression 28 adapted to receive a bead 27 extending radially inwardly from the channel portion 27a of the rim 11. The bead 27 is V-shaped in cross section to fit the depression 28, and the parts are so arranged that the jaws will snugly engage and conform to the surfaces of the bead 27 in either of the mutually reversed positions of the jaws on the respective sides of the web 16. This is accomplished preferably by making the sides of the bead 27 of equal inclination relative to a radial plane, and arranging for the angle between the jaws 24 and 25 to likewise be bisected by a radial plane when the lugs are tightened into operative position.

The radial planes bisecting the jaws 24 and 25, in the two positions of reversal of the lugs 12, are axially spaced from the plane of the web 16 a distance indicated at $i$ in Fig. 1, and thus are spaced from each other a distance equalling $2i$. In a like manner, the web portion 16 is off-set axially from the central attaching portion 13 of the wheel body, a distance indicated at $j$ in Fig. 1, and the plane of the web portion 16, in the positions of reversal of the wheel body 10, will be spaced from each other a distance equalling $2j$.

Similarly, the bead 27 is offset from the center of the rim 11, a distance indicated at $k$ in Fig. 1, and accordingly the central plane of the rim in the two positions of reversal thereof, will be spaced apart a distance equalling $2k$. The distances $i$, $j$ and $k$ are proportioned with respect to each other in accordance with the following equation:

$j$ equals $2k$ equals $4i$.

The reason for this proportion will presently appear.

In the position shown in Fig. 1, the rim 11 is at its position of maximum remoteness from the center of the vehicle of which the wheel forms a part. In this position, the wheel body projects toward the outside (relative to the center of the vehicle) from the hub on which it is mounted, the lug 12 is located on the outer side of the wheel body, and the major portion of the rim 11 is located on the outer side of the bead 27.

This position is shown diagrammatically in Fig. 3 as the first position indicated at A.

We will now assume that it is desired to make a minimum adjustment of the rim toward the center of the vehicle. Since the minimum displacement that can be secured by reversing one of the three elements of the wheel, is the distance $2i$ representing the displacement secured by reversing the lug 12, the lugs are detached, reversed and attached to the opposite side of the web portion 16, and the rim is shifted over to correspond to the new position of the jaws 24, 25. Tightening of the lugs in their new positions will secure the parts in the position B of Fig. 3. The distance between the positions A and B respectively, are here represented as $k$, which equals $2i$.

The next position of adjustment, toward the center of the vehicle, shown at C of Fig. 3, is attained by shifting the lugs back to their original positions, shown in Fig. 1, and reversing the rim so that the bead 27 is positioned adjacent the outer side of the rim and the major portion of the rim extends inwardly from the bead. As a result of these two reversals, the rim is shifted inwardly a distance of $2k$ with reference to the jaws 24, 25, but the latter are shifted outwardly a distance $2i$ or $k$, and therefore the resulting inward shift is again the distance $k$.

The next inward adjustment to the position D shown in Fig. 3 is attained in the same manner as the position B, by shifting the lugs 12 to the inner side of the wheel body.

This exhausts the possible positions of adjustment inwardly with reference to the web 16. In order to attain the next position of adjustment shown at E in Fig. 3, the wheel body 10 is reversed with relation to its mounting hub, resulting in an inward shift of the web portion 16 a distance $2j$ or $4k$, and the rim and lugs are both reversed back to their initial outer positions, resulting in an outward shift relative to the web 16 of a distance totalling $2k$ plus $k$ or $3k$ and this distance subtracted from $4k$ gives a resulting inward shift again of the distance $k$.

The remaining positions F, G and H, are reached in exactly the same manner as the positions B, C and D, the wheel body remaining in its inwardly projecting position.

It will be seen from the foregoing that the present invention provides 8 positions of adjustment with only a single set of cooperating faces in the lugs and rim. By providing a lug having two depressions, 28a and 28b as illustrated in Fig. 4, the number of possible positions of adjustment may be doubled. In this case, the distance $i$ would comprise the distance between the plane of the web portion 16 and the outer depression 28a of the lug 12a, and the distance from the center of the inner depression 28b to the plane of the web 16, would be one-half of the distance $i$. As in the other form of the invention, the distance $i$ would be one-half of the distance $k$ and one-fourth of the distance $j$.

The lug 12a may be made of leaf spring material, somewhat thicker in its body portion 21a than in its jaw region 24a, and instead of wedging the jaw region 24a between the seating periphery 20a, may be urged radially outwardly in a swinging movement about the seating region 20a as a fulcrum, by the drawing of the body portion 21a up to the web 16 when the bolt 26a is tightened. Thus the jaw region 24a of the lug may provide a certain amount of resiliency in the connection between the wheel body and the rim.

The general shape of the lug 12a may be similar to that of the lug 12 as shown in Fig. 2. The jaws 24 and 25 are formed in pairs which are spaced circumferentially from each other as shown in Fig. 2.

We claim:

1. An adjustable rim wheel comprising a tapered wheel body having a relatively thin edge region, said edge region being stiffened in an axial direction by a flange which is hook-shaped in cross-section, the outer surfaces of the flange defining oppositely disposed lug seating faces, a rim, and means cooperating with the rim and with one of the lug seating faces for securing the rim to the wheel body.

2. An adjustable rim wheel comprising a tapered wheel body having a relatively thin edge region, which is stiffened in an axial direction by a flange, said flange extending equally to either side of the plane of the edge region, the outer surfaces of the flange defining oppositely disposed lug seating faces, a rim, and means cooperating with the rim and with one of the lug seating faces for securing the rim to the wheel body.

3. An adjustable rim wheel comprising a tapered wheel body having a relatively thin edge region terminating in a flange which stiffens the wheel in an axial direction, said flange extending outwardly away from the plane of the edge region and then backwardly in the opposite direction across the plane of the edge region to define oppositely disposed lug seating faces, a rim, and means cooperating with the rim and with one of the lug seating faces for securing the rim to the wheel body.

4. An adjustable rim wheel comprising a wheel body having a relatively thin edge region, and a flange for stiffening the edge region in an axial direction, said flange being formed from an extension of the edge region having a cross-section in the form of an open loop disposed substantially symmetrically about the plane of the edge region and defining oppositely disposed frusto-conical surfaces, said open loop being resiliently deformable to absorb radial shock loads, a rim, and means cooperating with the frusto-conical surfaces for securing the rim to the wheel body.

5. A wheel with a removable rim, said wheel comprising a tapered wheel body having a central annular hub region, a dished region extending beyond the central hub region, and a radially extending region, said last-named region being relatively thin and terminating in a conical flange which is joined to an edge generally transversely disposed with respect to the last-mentioned region and radially spaced therefrom, a rim, and means cooperating with the transversely disposed edge for securing the rim to the wheel body, said transversely disposed edge being radially resilient and serving to absorb radial shock load.

JOS. W. JONES.
WALTON H. FRECHTLING.